United States Patent
Uenishi

(10) Patent No.: US 10,313,602 B2
(45) Date of Patent: Jun. 4, 2019

(54) IMAGE CAPTURE APPARATUS AND METHOD FOR CONTROLLING THE SAME

(71) Applicant: CANON KABUSHIKI KAISHA, Tokyo (JP)

(72) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/619,714

(22) Filed: Jun. 12, 2017

(65) Prior Publication Data

US 2017/0366727 A1   Dec. 21, 2017

(30) Foreign Application Priority Data

Jun. 17, 2016   (JP) ................................. 2016-121222

(51) Int. Cl.
  *H04N 5/235*   (2006.01)
  *H04N 5/232*   (2006.01)

(52) U.S. Cl.
  CPC ....... *H04N 5/2353* (2013.01); *H04N 5/23212* (2013.01)

(58) Field of Classification Search
  CPC ......................... H04N 5/2353; H04N 5/23212
  USPC ....................................................... 348/349
  See application file for complete search history.

(56) References Cited

U.S. PATENT DOCUMENTS

| | | | | |
|---|---|---|---|---|
| 2012/0182462 | A1* | 7/2012 | Hamada | H04N 5/23212 348/352 |
| 2013/0265482 | A1* | 10/2013 | Funamoto | H04N 5/23212 348/349 |
| 2015/0124153 | A1* | 5/2015 | Hamada | H04N 5/23212 348/349 |
| 2015/0256738 | A1* | 9/2015 | Inoue | G02B 7/34 348/362 |
| 2016/0112626 | A1* | 4/2016 | Shimada | H04N 5/347 348/349 |
| 2018/0063408 | A1* | 3/2018 | Takahara | G02B 7/34 |

FOREIGN PATENT DOCUMENTS

JP   2013-242589 A   12/2013

* cited by examiner

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

In an image capture apparatus, defocus amount detection and the exposure control are concurrently performed. If it is determined that a detected defocus amount is based on a signal obtained before exposure control has been completed, or if it is determined that the detected defocus amount is based on a signal affected by driving of an aperture in the exposure control, control of driving of a focusing lens that is based on the defocus amount is differentiated from control performed in other cases.

10 Claims, 10 Drawing Sheets

F I G. 2A

COLOR FILTER ARRANGEMENT

| R | Gb |
|---|---|
| Gr | B |
| R | Gb |
| Gr | B |
| R | Gb |
| Gr | B |
| R | Gb |
| Gr | B |
| R | Gb |
| Gr | B |

F I G. 2B

PHOTODIODE ARRANGEMENT

| R | R | B | Gb | Gb | B |
|---|---|---|---|---|---|
| A | | A | A | | A |
| Gr | Gr | B | B | | B |
| | A | | A | | A |
| R | R | B | Gb | Gb | B |
| | A | | A | | A |
| Gr | Gr | B | B | | B |
| | A | | A | | A |
| R | R | B | Gb | Gb | B |
| | A | | A | | A |
| Gr | Gr | B | B | | B |
| | A | | A | | A |
| R | R | B | Gb | Gb | B |
| | A | | A | | A |
| Gr | Gr | B | B | | B |
| | A | | A | | A |
| R | R | B | Gb | Gb | B |
| | A | | A | | A |
| Gr | Gr | B | B | | B |
| | A | | A | | A |

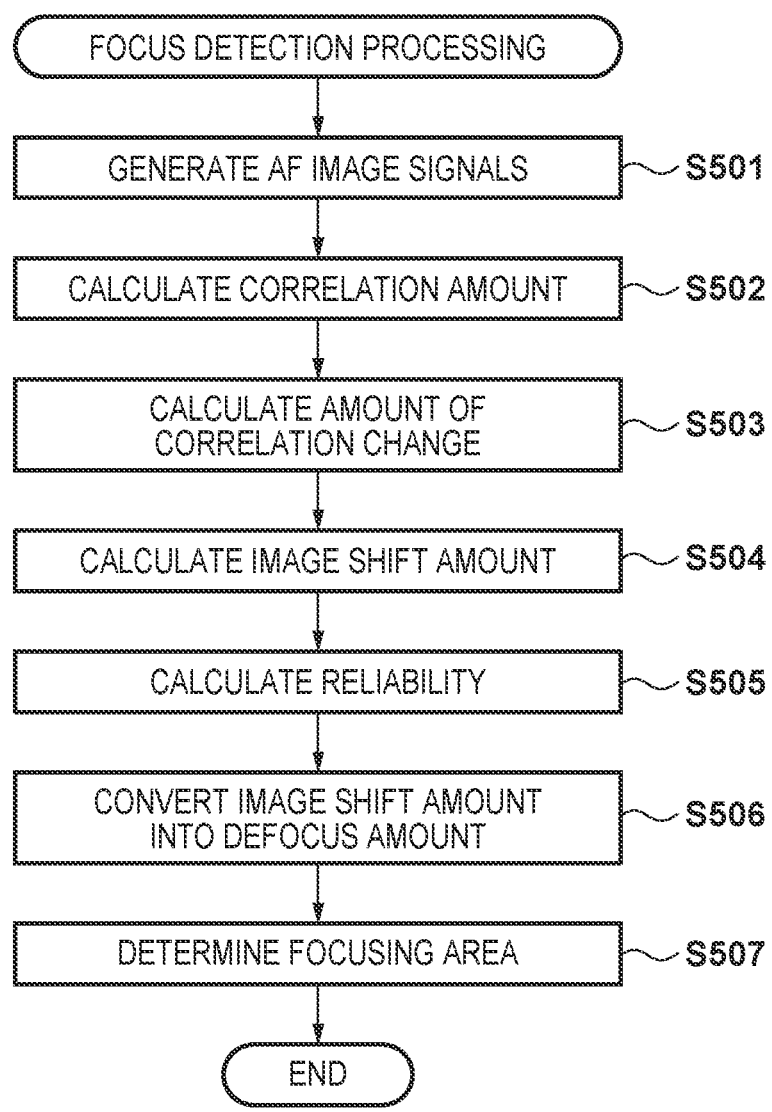

IMAGE CAPTURE APPARATUS AND METHOD FOR CONTROLLING THE SAME

BACKGROUND OF THE INVENTION

Field of the Invention

The present invention relates to image capture apparatuses and methods for controlling the same.

Description of the Related Art

Known autofocus (AF) techniques for automatically adjusting the in-focus distance in an imaging optical system based on signals obtained from an image sensor include contrast detection AF (contrast AF) and an imaging-plane phase-difference detection method (phase-difference AF).

The accuracy of these AF techniques (AF accuracy) is affected by the quality of signals obtained from the image sensor. For example, AF accuracy decreases if the exposure level in a focusing area suddenly changes during an AF operation. If the aperture is adjusted while performing the AF operation such that the amount of exposure during the AF operation does not significantly change, the change in the aperture may affect the contrast evaluation value and/or the defocus amount obtained from an image, resulting in a decrease in the AF accuracy.

Japanese Patent Laid-Open No. 2013-242589 proposes that, if an operation to change the aperture is performed during an AF operation, the AF operation is redone to suppress a decrease in AF accuracy due to the change in the aperture.

However, the method described in Japanese Patent Laid-Open No. 2013-242589 has a problem in that the time required by AF lengthens because the AF operation is redone when an operation to change the aperture is performed during the AF operation.

SUMMARY OF THE INVENTION

The present invention provides an image capture apparatus and a method for controlling the image capture apparatus capable of suppressing a decrease in AF accuracy without redoing the AF operation even if an exposure condition is changed during the AF operation.

According to an aspect of the present invention, there is provided an image capture apparatus comprising: a focus detection unit configured to detect a defocus amount in an imaging optical system based on a signal obtained from an image sensor; an exposure control unit configured to control exposure based on the signal obtained from the image sensor; and a control unit configured to control driving of a focusing lens based on the defocus amount, wherein: the defocus amount detection and the exposure control are concurrently performed, and the control unit differentiates control of driving of the focusing lens depending on whether (i) the defocus amount detected by the focus detection unit meets a first condition or a second condition or (ii) the defocus amount detected in the detecting does not meet any of the first condition and the second condition; the first condition is that it is determined that the defocus amount is based on a signal obtained before the exposure control is completed, and the second condition is that it is determined that the defocus amount is based on a signal affected by driving of an aperture in the exposure control.

According to another aspect of the present invention, there is provided an image capture apparatus comprising: a focus detection unit configured to detect a defocus amount in an imaging optical system based on a signal obtained from an image sensor; an exposure control unit configured to control exposure based on the signal obtained from the image sensor; and a control unit configured to control driving of a focusing lens based on the defocus amount, wherein the defocus amount detection and the exposure control are concurrently performed, and if the defocus amount detected by the focus detection unit meets a first condition or a second condition, the first condition being that a difference between a target exposure condition and a current exposure state is greater than or equal to a given value, and the second condition being that it is determined that the defocus amount is based on a signal affected by driving of an aperture in the exposure control, the control unit does not determine that the image capture apparatus is in an in-focus state, during the control of driving of the focusing lens that is based on the defocus amount.

According to a further aspect of the present invention, there is provided a method for controlling an image capture apparatus, comprising: detecting a defocus amount in an imaging optical system based on a signal obtained from an image sensor; controlling exposure based on the signal obtained from the image sensor; and controlling driving of a focusing lens based on the defocus amount, wherein: the detecting and the controlling exposure are concurrently performed, and in the controlling driving, the driving of the focusing lens is differentiated depending on whether (i) the defocus amount detected in the detecting meets a first condition or a second condition or (ii) the defocus amount detected in the detecting does not meet any of the first condition and the second condition; the first condition is that it is determined that the defocus amount is based on a signal obtained before the exposure control is completed, and the second condition is that it is determined that the defocus amount is based on a signal affected by driving of an aperture in the exposure control.

According to another aspect of the present invention, there is provided a method for controlling an image capture apparatus, comprising: detecting a defocus amount in an imaging optical system based on a signal obtained from an image sensor; controlling exposure based on the signal obtained from the image sensor; and controlling driving of a focusing lens based on the defocus amount, wherein the defocus amount detection and the exposure control are concurrently performed, and if, in the controlling of driving of the focusing lens, the defocus amount detected in the defocus amount detection meets a first condition or a second condition, the first condition being that a difference between a target exposure condition and a current exposure state is within a given value, and the second condition being that it is determined that the defocus amount is based on a signal affected by driving of an aperture in the exposure control, it is not determined that the image capture apparatus is in an in-focus state during the control of driving of the focusing lens that is based on the defocus amount.

According to a further aspect of the present invention, there is provided a non-transitory computer-readable medium storing a program for causing a computer provided in an image capture apparatus to function as an image capture apparatus comprising: a focus detection unit configured to detect a defocus amount in an imaging optical system based on a signal obtained from an image sensor; an exposure control unit configured to control exposure based on the signal obtained from the image sensor; and a control unit configured to control driving of a focusing lens based on the defocus amount, wherein: the defocus amount detection and the exposure control are concurrently performed, and the control unit differentiates control of driving of the focusing lens depending on whether (i) the defocus amount detected by the focus detection unit meets a first condition or a second condition or (ii) the defocus amount detected in the detecting does not meet any of the first condition and the second condition; the first condition is that it is determined that the defocus amount is based on a signal obtained before the exposure control is completed, and the second condition is that it is determined that the defocus amount is based on a signal affected by driving of an aperture in the exposure control.

According to another aspect of the present invention, there is provided a non-transitory computer-readable medium storing a program for causing a computer provided in an image capture apparatus to function as an image capture apparatus comprising: a focus detection unit configured to detect a defocus amount in an imaging optical system based on a signal obtained from an image sensor; an exposure control unit configured to control exposure based on the signal obtained from the image sensor; and a control unit configured to control driving of a focusing lens based on the defocus amount, wherein the defocus amount detection and the exposure control are concurrently performed, and if the defocus amount detected by the focus detection unit meets a first condition or a second condition, the first condition being that a difference between a target exposure condition and a current exposure state is greater than or equal to a given value, and the second condition being that it is determined that the defocus amount is based on a signal affected by driving of an aperture in the exposure control, the control unit does not determine that the image capture apparatus is in an in-focus state, during the control of driving of the focusing lens that is based on the defocus amount.

Further features of the present invention will become apparent from the following description of exemplary embodiments with reference to the attached drawings.

BRIEF DESCRIPTION OF THE DRAWINGS

FIGS. 2A and 2B are diagrams showing an exemplary arrangement of color filters and photodiodes on an image sensor according to an embodiment.

FIG. 5 is a flowchart relating to the details of focus detection processing in FIGS. 4A and 4B.

DESCRIPTION OF THE EMBODIMENTS

Exemplary embodiments of the present invention will now be described in detail in accordance with the accompanying drawings. Note that a description will be given below of embodiments of this invention applied to an interchangeable-lens digital camera, which serves as an example of an image capture apparatus. However, this invention is applicable to electronic devices having an automatic focus adjustment function that is based on image signals. Such electronic devices include digital cameras, mobile phones, personal computers (desktop, laptop, tablet etc.), projectors, game consoles, robots, domestic appliances, drive recorders, and the like, but are not limited thereto.

Figure 1:
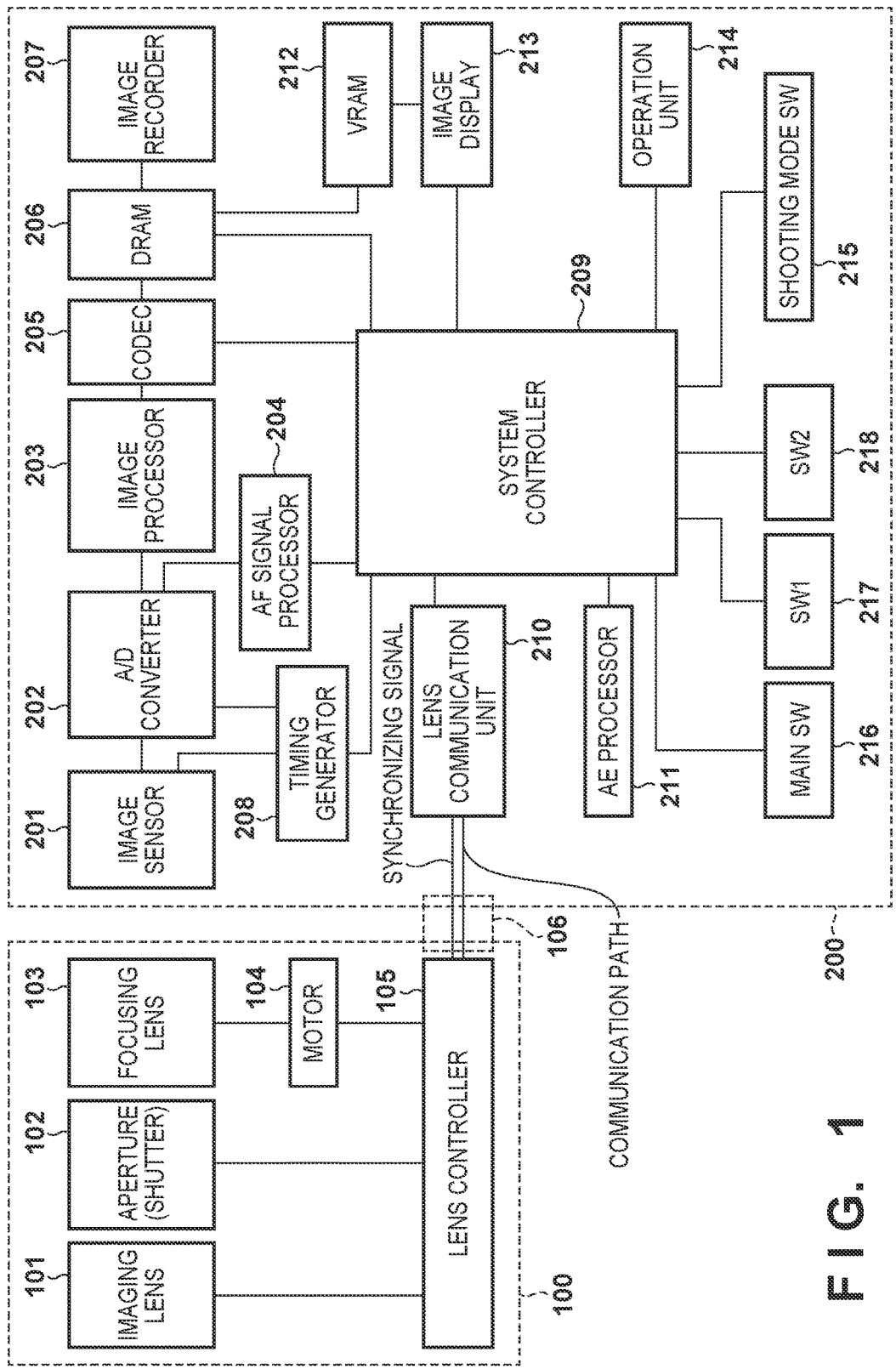
FIG. 1 is a block diagram showing an exemplary functional configuration of an interchangeable-lens digital camera, which serves as an example of an image capture apparatus according to an embodiment.

FIG. 1 is a block diagram showing an exemplary functional configuration of the digital camera according to the embodiment of this invention. The digital camera is constituted by a main body 200 and a lens unit (interchangeable lens) 100. The lens unit 100, which is removable from a mount portion of the main body 200, is supplied with power from the main body 200 and communicates with the main body 200 through an electrical contact unit 106 that is provided in the mount portion.

The lens unit 100 includes an imaging lens 101, an aperture (shutter) 102, a focusing lens 103, a motor 104, and a lens controller 105. The imaging lens 101, the aperture 102, and the focusing lens 103 form an imaging optical system. The imaging lens 101 may include a magnification lens. The aperture 102 also functions as a shutter. The focusing lens 103 can be moved by the motor 104, and adjusts the focus of the imaging optical system. The operation of the motor 104 is controlled by the lens controller 105. Note that the imaging optical system may include a stabilization lens, a filter, or the like.

In the main body 200, an image sensor 201 is a CCD or CMOS image sensor, and has a plurality of pixels that are arranged in a matrix. In this embodiment, the image sensor 201 has a pupil division function, and an AF signal and an imaging signal can be read out therefrom. In the image sensor 201, an object image, which is formed on an imaging plane by the imaging optical system, is converted into an electrical signal by a photoelectric converter (photodiode) in each pixel, and is then output.

An A/D converter 202 includes a correlated double sampling (CDS) circuit, a non-linear amplifier circuit, and an A/D converter circuit. The CDS circuit reduces noise in the electrical signal output by the image sensor 201. The electrical signal that has been amplified by the non-linear amplifier circuit is converted into a digital signal by the A/D converter circuit. The A/D converter 202 outputs AF signals among signals read out from the image sensor 201 to an AF signal processor 204, and outputs imaging signals among those read signals to an image processor 203.

The image processor 203 applies various kinds of image processing to the digital signal output by the A/D converter 202. Image processing that can be performed by the image processor 203 may include white balance adjustment, demosaicing processing, hue correction processing, object recognition processing, object tracking processing, scaling processing, filtering processing, and the like, but is not limited thereto. The image processor 203 outputs digital signals (image data) that have been processed for recording to a codec 205. Also, the image processor 203 outputs digital signals (image data) that have been processed for display or automatic exposure control (AE) to a system controller 209. For example, the image data for display may have a lower resolution than the image data for recording. The image data for AE may be the same as the image data for display, or may be image data in a partial area such as a focusing area or an object area. However, these are merely an example, and the invention is not limited thereto.

The AF signal processor 204 generates a pair of image signals to be used in phase-difference AF based on the AF signals supplied from the A/D converter 202, performs correlation calculation while changing relative positions of the image signals, and calculates a phase difference (image shift amount) between the image signals. The AF signal processor 204 also calculates information regarding reliability of an image shift amount (two-image coincidence degree, two-image steepness degree, contrast information, saturation information, damage information etc.). The AF signal processor 204 outputs, to the system controller 209, the calculated image shift amount as-is, or after converting the image shift amount into the amount and direction of defocus, together with the reliability information.

The system controller 209 can change settings for correlation calculation and reliability information calculation in the AF signal processor 204 based on the image shift amount or the defocus amount obtained from the AF signal processor 204, as well as the reliability information. For example, if it is determined that the defocus amount is greater than a threshold value, the system controller 209 can increase the maximum shift amount in the correlation calculation, and can change the type of band pass filter to be used by the AF signal processor 204 in accordance with the contrast information.

The codec 205 encodes image data and audio data and decodes encoded image data or audio data in accordance with a predetermined coding method (e.g. JPEG or MPEG method).

An internal memory 206 is a random access memory, for example, and is also mentioned as a DRAM. The internal memory 206 is used as a buffer to be used to temporarily store an image, or a work memory during coding processing and decoding processing performed by the codec 205. The internal memory 206 is also used as a work memory for the system controller 209, which will be described later.

An image recorder 207 is constituted by a recording medium such as a memory card, and an interface for reading and writing data from/to the recording medium.

A timing generator 208 supplies a timing signal to control the operation of the image sensor 201 in accordance with control performed by the system controller 209. Note that the timing generator 208 also supplies a timing signal to functional blocks other than the image sensor 201 as required.

The system controller 209 includes, for example, a CPU (not shown), and a nonvolatile memory for storing a program to be performed by the CPU, and controls overall operation of the digital camera, including a later-described AF operation, for example.

A lens communication unit 210 is an interface for communication between the main body 200 (system controller 209) and the lens unit 100 (lens controller 105).

An AE processor 211 performs AE processing based on the image data obtained from the image processor 203. AE processing is roughly divided into the following processes:
process 1—generation of an evaluation value;
process 2—determination of an exposure condition;
process 3—change of the exposure time for the next frame; and
process 4—change of the f-number (aperture diameter).

The AE evaluation value (photometric value) generated in the process 1 may be an evaluation value related to the luminance of an image, for example, and typically, the evaluation value is generated through processing including integration of pixel values, conversion of an RGB component values into a luminance value, and the like.

In the process 2, for example, a program chart is referenced based on the evaluation value generated in the process 1, and a combination of the exposure time, the f-number, and the ISO speed is determined. For example, because a change in the f-number may affect the depth of field, the exposure time can be preferentially adjusted. The ISO speed can be adjusted when the exposure time and the f-number exceed their adjustable ranges. However, these are merely an example, and in this embodiment, there is no particular limitation on how to change the exposure condition in accordance with a change in the evaluation value.

The processes 3 and 4 are performed only when necessary, e.g. when an exposure condition that is different from the current setting is determined in the process 2. Note that, in this embodiment, the setting of the exposure time and control of driving of the aperture 102 are performed by the system controller 209. For this reason, when the process 3 and/or 4 is necessary, the AE processor 211 outputs the exposure time and the f-number to the system controller 209, and the system controller 209 performs the actual control for the change.

Note that the processes 1 to 4 in AE processing can be performed solely by the system controller 209, or can be performed by a combination of the image processor 203 and the system controller 209. In this case, the AE processor 211 does not need to be provided independently.

An image display memory (VRAM) 212 is a memory for storing display image data that is to be displayed on an image display 213. The image display 213 displays a captured image and a reproduced image. The image display 213 also superimposes, on the display, an image for assisting in operation, an image indicating camera status, an image indicating a focusing area, or the like on the captured image and the reproduced image, and displays a GUI image of a menu screen or the like. The image display 213 also functions as a monitor for displaying a live view.

An operation unit 214 is an input device (key, button, touch panel, dial etc.) with which a user makes an instruction to the digital camera. The operation unit 214 includes a menu switch for displaying a menu screen for configuring various settings, a zoom lever for making an instruction to perform a zoom operation of the imaging lens, a switch for switching the operation mode (shooting mode and reproduction mode), an up-down/left-right direction key, and the like, but is not limited thereto. If the image display 213 is a touch panel display, the image display 213 also functions as part of the operation unit 214.

A shooting mode switch 215 is a switch for selecting one of various shooting modes provided in the digital camera. The shooting modes may include, for example, a macro mode, a sports mode, a firework mode, a portrait mode, or the like, but are not limited thereto. A main switch 216 is a power switch.

A SW1 217 is a switch that turns on when a shutter button is half-pressed, for example. The turning on of the SW1 217 is an instruction to start a shooting standby operation. Upon the SW1 217 turning on, the system controller 209 starts the shooting standby operation. The shooting standby operation includes AF processing and AE processing, for example. A SW2 218 is a switch that turns on when the shutter button is full-pressed, for example. The turning on of the SW2 218 is an instruction to start a shooting operation for recording. Upon the SW2 218 turning on, the system controller 209 starts a shooting operation and a recording operation that are based on the result of shooting standby operation.

The image sensor 201 according to this embodiment is provided with regularly arranged color filters of multiple colors, and a color filter of one of the multiple colors is arranged on each pixel. Here, it is assumed that color filters of three colors, namely red (R), green (G), and blue (B) are provided in the Bayer arrangement, as shown in FIG. 2A. Note that green filters are provided both between red filters and between blue filters, and the former and latter green filters will be denoted respectively as Gr and Gb.

A microlens array is also provided in the image sensor 201 according to this embodiment, and one microlens corresponds to one pixel. Each pixel is provided with a plurality of photodiodes (photoelectric converters). In this embodiment, each pixel is provided with two photodiodes A and B having the same size. FIG. 2B shows an arrangement of the photodiodes A and B that corresponds to the color filter arrangement shown in FIG. 2A. Although each pixel here has two photodiodes that are separated in the horizontal direction, the number of separated photodiodes and the separating direction may be different. For example, three or more photodiodes that are separated in the horizontal direction, or photodiodes that are separated in the vertical direction, or photodiodes separated in a plurality of directions may be employed. Pixels with different number of separated photodiodes or a different separating direction may be included.

As a result of a plurality of photodiodes sharing one microlens, individual photodiodes receive different part of a light beam that exits from an exit pupil in the imaging optical system. Accordingly, in the case of the configuration shown in FIG. 2B, phase-difference AF can be performed using an image signal (image A signal) that is formed by a signal group obtained from photodiodes A in the plurality of pixels, and an image signal (image B signal) that is formed by a signal group obtained from photodiodes B. In the following description, a signal obtained from some of the plurality of photodiodes that share one microlens will be called an AF signal or a focus detection signal. On the other hand, a signal obtained from all of the plurality of photodiodes that share one microlens is the same signal as one obtained when the photodiodes are not separated, and accordingly will be called an imaging signal or an added signal.

In the example in FIG. 2B, a signal (signal A (B)) obtained from one photodiode A (B) is an AF signal, and an added signal (also called an A+B signal) obtained by adding a signal A and a signal B acquired from the same pixel is an imaging signal. An image signal formed by a plurality of signals A is an image A signal, and an image signal formed by a plurality of signals B is an image B signal. As will be described later, the AF signal processor 204 detects the defocus amount and the defocus direction based on a phase difference (image shift amount) between the image A signal and the image B signal.

Figure 3:
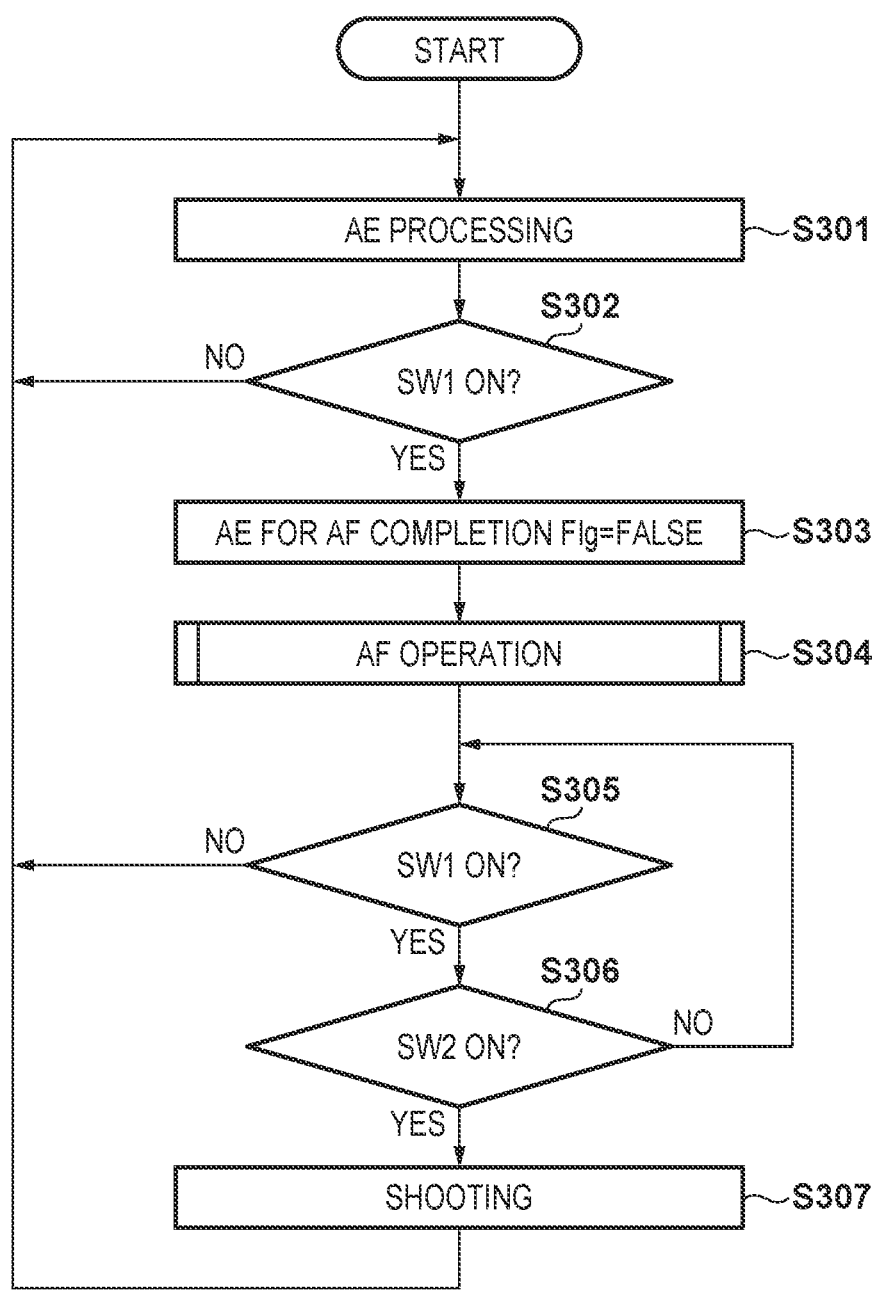
FIG. 3 is a flowchart relating to an overall operation of the image capture apparatus according to an embodiment.

Next, a description will be given, using the flowchart shown in FIG. 3, of the overall operation in the shooting mode of the digital camera according to this embodiment. The operation shown in FIG. 3 is performed when a shooting mode is set and the digital camera is in a shooting standby state. In the shooting standby state, the system controller 209 continuously shoots a moving image and displays the shot moving image on the image display 213, thereby causing the image display 213 to function as an EVF. The image processor 203 supplies part of or the entire image data of a captured moving image frame to the AE processor 211 through the system controller 209.

In step S301, the AE processor 211 performs AE processing based on the image data obtained from the image processor 203, and advances the processing to step S302. The AE processor 211 determines an exposure condition (aforementioned processes 1 and 2) and performs exposure control (aforementioned processes 3 and 4). Thus, the exposure of the live view image that is being displayed can be maintained at a correct level.

In step S302, the system controller 209 determines whether the SW1 217 is ON, advances the processing to step S303 if it is determined that the SW1 217 is ON, and returns the processing to step S301 if not.

In step S303, the system controller 209 initializes a flag (AE for AF completion Flg) that indicates whether AE processing for AF has been completed such that the flag is FALSE (uncompleted).

In step S304, the AF signal processor 204 performs later-described AF processing, outputs an image shift amount (or an amount and direction of defocus) and reliability information to the system controller 209, and advances the processing to step S305.

Note that, in step S304, AE processing for AF and AF processing are concurrently performed. Note that, because the aperture is mechanically driven, this driving takes time. Further, the aperture is driven concurrently with and independently of AF processing, and therefore, the aperture driving period possibly spans over charge accumulation periods for a plurality of frames.

In step S305, the system controller 209 determines whether the SW1 217 is ON, advances the processing to step S306 if it is determined that the SW1 217 is ON, and returns the processing to step S301 if not.

In step S306, the system controller 209 determines whether the SW2 218 is ON, advances the processing to step S307 if it is determined that the SW2 218 is ON, and returns the processing to step S305 if not.

In step S307, the system controller 209 performs a shooting operation, and returns the processing to step S301.

Figure 4A:
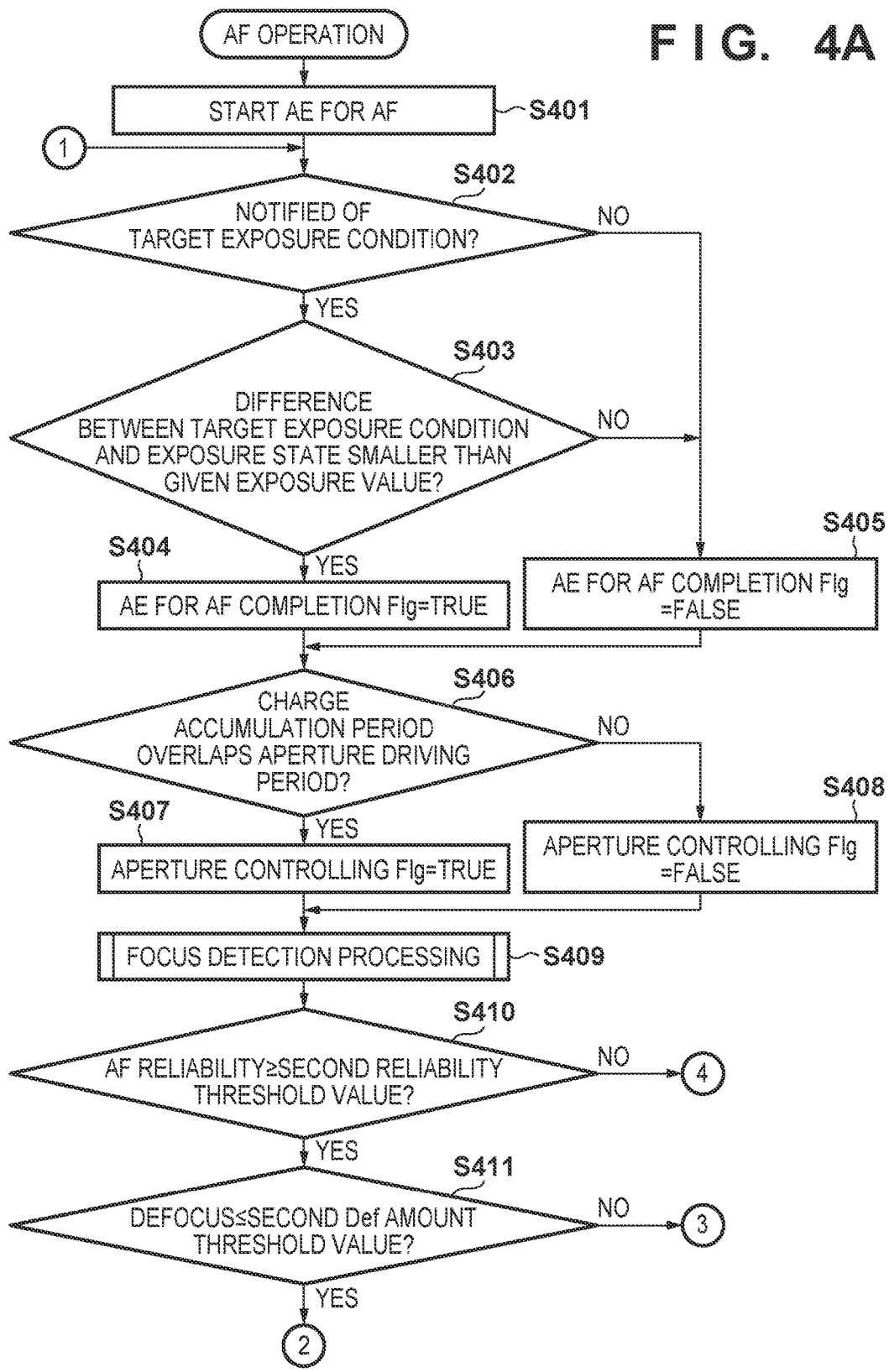
FIGS. 4A and 4B are flowcharts relating to the details of the AF operation in FIG. 3.
Figure 4B:
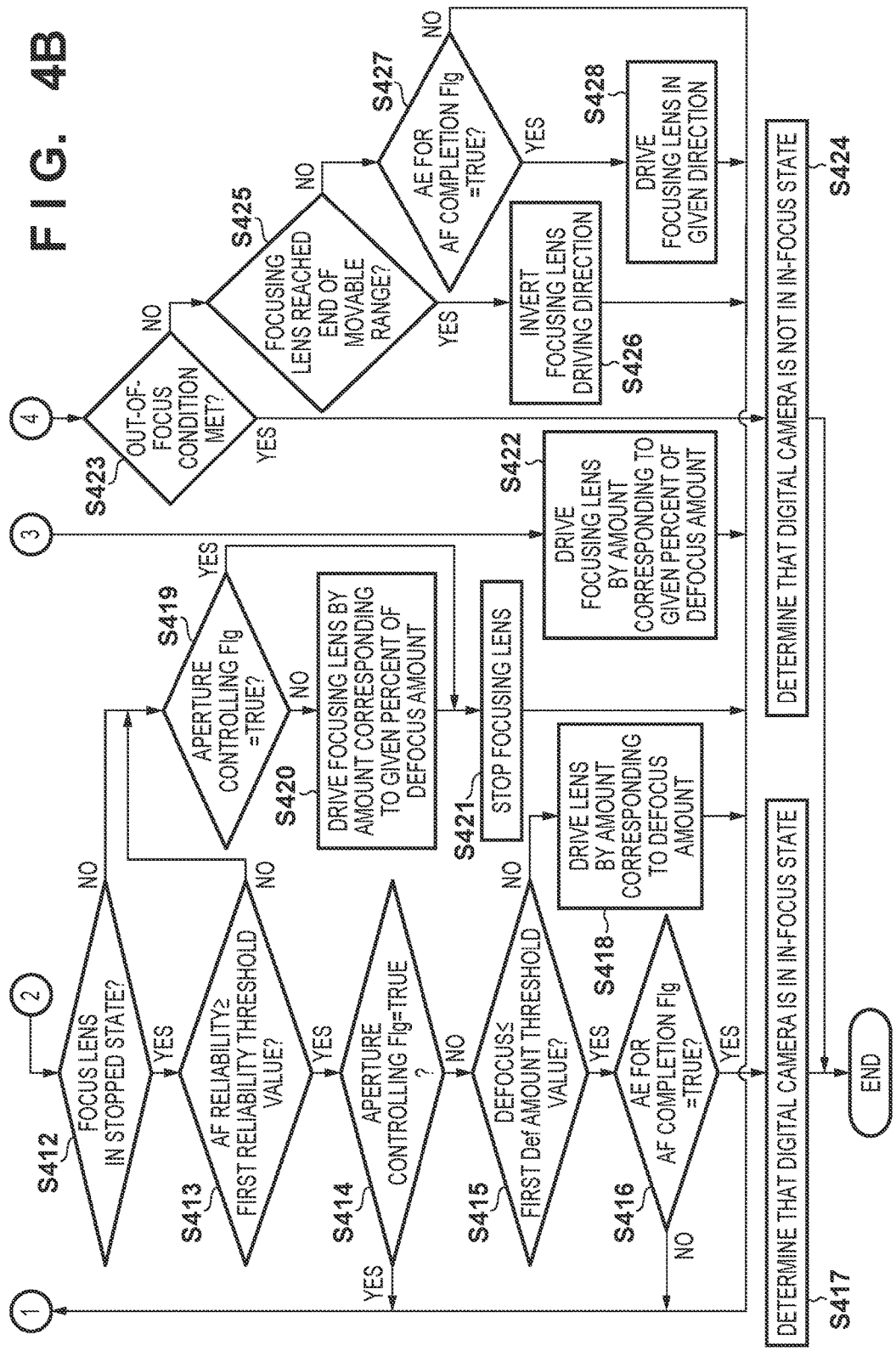

FIGS. 4A and 4B are flowcharts illustrating the AF operation in step S304 in FIG. 3.

In step S401, the system controller 209 starts AE processing for AF, and advances the processing to step S402. After AE processing for AF is started here, AE processing is performed concurrently with AF control.

In step S402, the system controller 209 checks whether the system controller 209 has been notified of a target exposure condition determined through AE control, advances the processing to step S403 if so, and advances the processing to step S405 if not.

In step S403, the system controller 209 determines whether the difference between the target exposure condition and the current exposure state is smaller than a given exposure value, advances the processing to step S404 if it is determined that the difference is smaller than the given exposure value, and advances the processing to step S405 if not. If, for example, the given exposure value is set to 1.5, the system controller 209 determines in step S403 whether the following condition is met:

$$(\text{target } Av + \text{target } Tv - \text{target Gain}) - (\text{current } Av + \text{current } Tv - \text{current Gain}) < 1.5$$

Av: f-number v: shutter speed Gain: delta gain.

In step S404, the system controller 209 sets, to TRUE, the flag (AE for AF completion Flg) indicating whether AE processing for AF has been completed, and advances the processing to step S406.

In step S405, the system controller 209 sets the AE for AF completion Flg to FALSE, and advances the processing to step S406. Thus, different AF processing can be performed between the case where AF processing is based on a signal obtained before exposure control is completed and the case where AF processing is based on a signal obtained after exposure control is completed.

In step S406, in the case where the aperture is driven during AE processing for AF, the system controller 209 determines whether the aperture driving period overlaps the charge accumulation period for the image to be used in AF processing. The system controller 209 can comprehend the charge accumulation period for the individual frames based on the timing of a vertical synchronizing signal and the length of the charge accumulation period that is set for the timing generator 208, for example. Also, the system controller 209 can comprehend the aperture driving period based on the timing at which the system controller 209 transmitted a request (command) to drive the aperture 102 with a given f-number to the lens controller 105, and the timing at which the system controller 209 received a drive-end notification from the lens controller 105. Based on that information, the system controller 209 can determine whether the aperture driving period overlaps the charge accumulation period for the frame to be used in focus detection processing in step S409 (i.e. whether the aperture was driven during the charge accumulation period). Note that the above described determination method is merely an example, and the determination may be made based on any other methods.

The system controller 209 advances the processing to step S407 if it is determined that the aperture driving period overlaps the charge accumulation period, and advances the processing to step S408 if the aperture was not driven during AE processing for AF, or it is not determined that the aperture driving period overlaps the charge accumulation period.

In step S407, the system controller 209 sets, to TRUE (overlap), a flag (aperture controlling Flg) that indicates whether the aperture driving period overlaps the charge accumulation period, and advances the processing to step S409.

In step S408, the system controller 209 sets the aperture controlling Flg to FALSE (not overlap), and advances the processing to step S409.

In step S409, the AF signal processor 204 performs focus detection processing, detects a defocus direction and a defocus amount, obtains reliability of the defocus amount (AF reliability), outputs the results to the system controller 209, and advances the processing to step S410. The details of focus detection processing in step S409 will be described later.

In step S410, the system controller 209 determines whether the AF reliability generated by the AF signal processor 204 in step S409 is greater than or equal to a preset second reliability threshold value. If it is determined that the AF reliability is greater than or equal to the second reliability threshold value, the system controller 209 advances the processing to step S411, and if not, the system controller 209 advances the processing to step S423. Here, regarding the second reliability threshold value, a reliability being smaller than the second reliability threshold value indicates that the accuracy of the defocus amount cannot be guaranteed, but the defocus direction (direction in which the focusing lens is to be moved) can be guaranteed. The second reliability threshold value can be set in advance using an experimental method, for example.

In step S411, the system controller 209 determines whether the defocus amount obtained through focus detection processing is smaller than or equal to a preset second Def amount threshold value, advances the processing to step S412 if it is determined that the obtained defocus amount is smaller than or equal to the second Def amount threshold value, and advances the processing to step S422 if not. Here, regarding the second Def amount threshold value, a defocus amount being smaller than or equal to the second Def amount threshold value is a defocus amount (e.g. five depths) with which the number of times that the lens thereafter needs to be driven to drive the focusing lens into the focal depth is within a given number of times (e.g. three times or less). The second Def amount threshold value can be set in advance based on the largest defocus amount obtained through focus detection processing.

In step S412, the system controller 209 determines whether the focusing lens 103 is in a stopped state, advances the processing to step S413 if it is determined that the focusing lens is in a stopped state, and advances the processing to step S419 if not. For example, the system controller 209 can comprehend the state of the focusing lens 103 by making an inquiry thereabout to the lens controller 105.

In step S413, the system controller 209 determines whether the AF reliability is greater than or equal to a preset first reliability threshold value. If it is determined that the AF reliability is greater than or equal to the first reliability threshold value, the system controller 209 advances the processing to step S414, and if not, the system controller 209 advances the processing to step S419. Here, regarding the first reliability threshold value, if a reliability is greater than or equal to the first reliability threshold value, settings have been configured such that a fluctuation in the accuracy of the defocus amount falls within a given range (e.g. less than or equal to one depth). That is to say, being greater than or equal to the first reliability threshold value indicates a greater reliability than being greater than or equal to the second reliability threshold value does. The first reliability threshold value can be set in advance using an experimental method, for example.

In step S414, the system controller 209 determines whether the aperture controlling Flg is TRUE, returns the processing to step S402 if it is determined that the aperture controlling Flg is TRUE, and advances the processing to step S415 if not. If the aperture controlling Flg is TRUE, it indicates that the defocus amount detected in step S409 is based on an image affected by the aperture being driven. If the aperture controlling Flg is TRUE, it is possible to avoid driving the focusing lens and performing focus determination based on a defocus amount affected by the driving of the aperture, by returning the processing to step S402.

In step S415, the system controller 209 determines whether the defocus amount detected by the AF signal processor 204 is smaller than or equal to a preset first Def amount threshold value. If it is determined that the defocus amount is smaller than or equal to the first Def amount threshold value, the system controller 209 advances the processing to step S416, and if not, the system controller 209 advances the processing to step S418. Here, the first Def amount threshold value is set to a value indicating that, if the defocus amount is smaller than or equal to the first Def amount threshold value, the focusing lens 103 has been driven into a range in which an object is brought into focus in the imaging optical system (i.e. an image distance in the imaging optical system falls within the focal depth). That is to say, being smaller than or equal to the first Def amount threshold value indicates a higher degree of focus than being smaller than or equal to the second Def amount threshold value does.

In step S416, the system controller 209 determines whether the AE for AF completion Flg is TRUE, advances the processing to step S417 if it is determined that the AE for AF completion Flg is TRUE, and returns the processing to step S402 if not. Thus, it is possible to avoid performing focus determination based on the defocus amount that was detected with AE processing for AF uncompleted.

In step S417, the system controller 209 determines that the digital camera is in an in-focus state, and ends focus detection processing.

In step S418, the system controller 209 drives the focusing lens 103 by a moving amount in a moving direction corresponding to the defocus amount and the defocus direction that were detected by the AF signal processor 204 in step S409, and returns the processing to step S402. For example, the system controller 209 transmits, to the lens controller 105, a request to drive the focusing lens 103 including the direction and amount of driving. The lens controller 105 then drives the motor 104 in accordance with the driving request, and moves the focusing lens 103.

As a result of the processing in steps S412 to S418, in the case where the AF reliability is greater than or equal to the first reliability threshold value, the defocus amount can be detected again with the lens stopped.

In step S419, the system controller 209 determines whether the aperture controlling Flg is TRUE, advances the processing to step S421 if it is determined that the aperture controlling Flg is TRUE, and advances the processing to step S420 if not. When the defocus amount is smaller than or equal to the second Def amount threshold value, it is possible to avoid driving the focusing lens based on the defocus amount affected by the driving of the aperture, by skipping step S420 when it is determined that the aperture controlling Flg is TRUE.

In step S420, the system controller 209 drives the focusing lens 103 by an amount smaller than the moving amount corresponding to the defocus amount in a direction corresponding to the defocus direction, and advances the processing to step S421. For example, the system controller 209 drives the focusing lens by an amount corresponding to a given percentage (e.g. 80%) of the defocus amount.

In step S421, the system controller 209 stops the focusing lens 103 through the lens controller 105, and returns the processing to step S402.

In step S422, the system controller 209 drives the focusing lens 103 by an amount smaller than the moving amount corresponding to the defocus amount in a direction corresponding to the defocus direction, and returns the processing to step S402. For example, the system controller 209 can set a smaller driving amount of the focusing lens 103 than the amount corresponding to the defocus amount by setting a lower driving speed than the driving speed at which the focusing lens 103 moves by an amount corresponding to the defocus amount within the time corresponding to a one-frame period during moving image shooting.

By driving the focusing lens 103 at that speed, it is possible to prevent the focusing lens 103 from being moved beyond the focus position of the object when the defocus amount is incorrect. Furthermore, the driving can be continuously performed based on the defocus amount that is based on the next frame in a state of driving the focusing lens without stop (overlap control). When the defocus amount is greater than the second Def amount threshold value, the focusing lens can be driven based on the defocus amount that was affected by the driving of the aperture.

In step S423, the system controller 209 determines whether a not-in-focus condition is met, advances the processing to step S424 if it is determined that the not-in-focus condition is met, and advances the processing to step S425 if not. Note that meeting the not-in-focus condition unit meeting a condition under which it is determined that no object to be brought into focus is present. For example, the not-in-focus condition may be the case where the focusing lens 103 has been driven over the entire movable range, i.e. the case where the position of the focusing lens 103 has reached both lens ends on the telephoto side and the wide angle side and then returned to the initial position. The system controller 209 can acquire the information regarding the position of the focusing lens 103 through the lens controller 105.

In step S424, the system controller 209 determines that the digital camera is in an out-of-focus state, and ends focus detection processing.

In step S425, the system controller 209 determines whether the focusing lens 103 has reached an end (limit) of its movable range, advances the processing to step S426 if it is determined that the focusing lens 103 has reached an end, and advances the processing to step S427 if not. The system controller 209 can perform the determination based on the information regarding the position of the focusing lens 103. When the focusing lens 103 has reached an end (limit) of the movable range, the lens controller 105 may notify the system controller 209 of that effect.

In step S426, the system controller 209 transmits, to the lens controller 105, a command to reverse the driving direction of the focusing lens 103, and returns the processing to step S402.

In step S427, the system controller 209 determines whether the AE for AF completion Flg is TRUE (completed), advances the processing to step S428 if it is determined that the AE for AF completion Flg is TRUE, and returns the processing to step S402 if not.

In step S428, the system controller 209 drives the focusing lens 103 in the direction according to the current setting, irrespective of the defocus amount, and returns the processing to step S402. Here, for example, the system controller 209 sets the focusing lens driving speed to the fastest speed within a range in which the focusing lens does not pass through the in-focus position, after the defocus amount becomes detectable. Through the processing in steps S427 and S428, it is possible to avoid driving the focusing lens 103 in a given direction with AE for AF uncompleted. For this reason, the focusing lens being unnecessarily driven can be suppressed in the case where AE for AF has not been completed, and where the AF reliability is low because focus detection has been performed based on an image obtained under an exposure condition that significantly deviates from a correct exposure.

Next, a description will be given, using the flowchart in FIG. 5, of the details of focus detection processing performed in step S409 in FIG. 4A.

Initially, in step S501, the AF signal processor 204 generates a pair of AF image signals (image A signal and image B signal) using signals of the pixels included in a set focus detection area among signals obtained from the A/D converter 202, and advances the processing to step S502.

In step S502, the AF signal processor 204 calculates a correlation amount between the image signals, and advances the processing to step S503.

In step S503, the AF signal processor 204 calculates an amount of correlation change based on the correlation amount calculated in step S502, and advances the processing to step S504.

In step S504, the AF signal processor 204 calculates an image shift amount based on the amount of correlation change, and advances the processing to step S505.

In step S505, the AF signal processor 204 calculates a reliability of the image shift amount, and advances the processing to step S506. This reliability is used as the reliability of the defocus amount (AF reliability) obtained by converting the corresponding image shift amount.

The AF signal processor 204 performs the processing in steps S501 to S505 for each focusing area that is present within the focus detection area. Then, in step S506, the AF signal processor 204 converts the image shift amount calculated for each focusing area into a defocus amount, and advances the processing to step S507.

In step S507, the AF signal processor 204 determines a focusing area to be used in AF, sets the defocus amount in the determined focusing area and the corresponding AF reliability as a focus detection processing result, and ends focus detection processing.

Focus detection processing described in FIG. 5 will now be described in more detail using FIGS. 6 to 8B.

Figure 6:
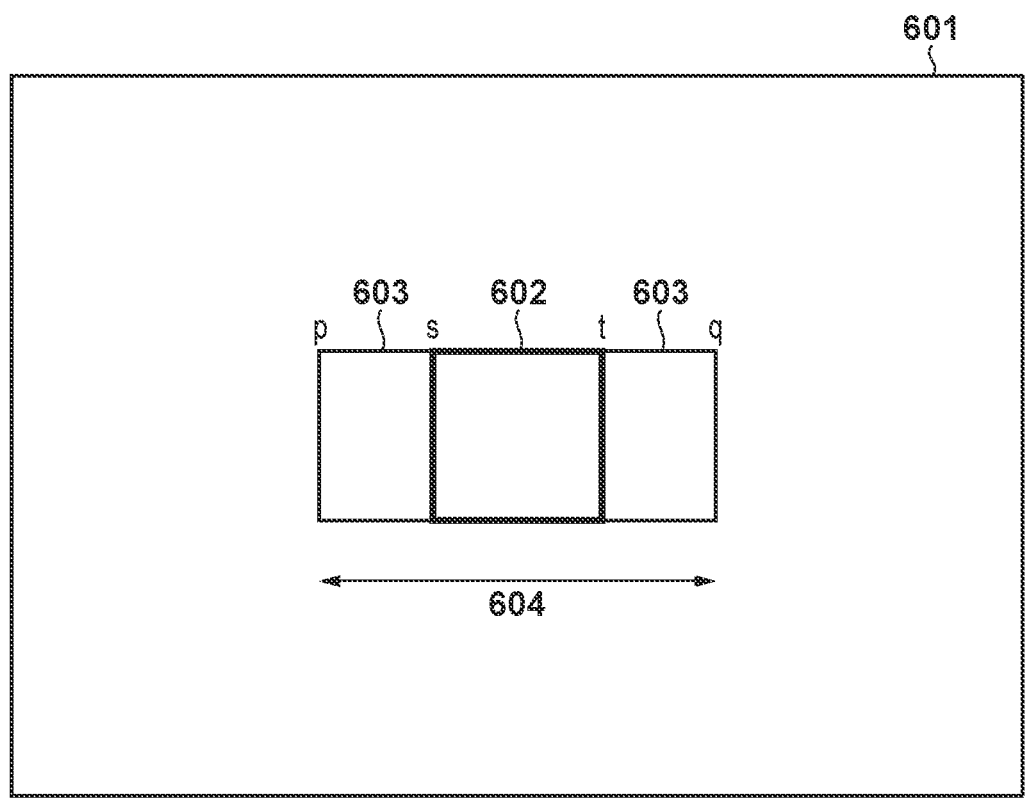
FIG. 6 is a diagram schematically showing an example of a focus detection area used in focus detection processing according to an embodiment.

FIG. 6 is a diagram schematically showing an example of a focus detection area and a focusing area that are dealt with in focus detection processing. A focus detection area 602 is set to a portion of a pixel array 601 in the image sensor 201. The size and position of the focus detection area 602 shown in FIG. 6 are merely an example. Shift areas 603 that are present to the left and right of the focus detection area 602 are areas necessary for correlation calculation. Accordingly, a pixel area 604, which is a combination of the focus detection area 602 and the shift areas 603, is a pixel area necessary for correlation calculation. p, q, s, and t in the diagram denote coordinates in the x-axis direction, where p and q denote x coordinates of a starting point and an end point of the pixel area 604, and s and t denote x coordinates of a starting point and an end point of the focus detection area 602, respectively.

Figure 7A:
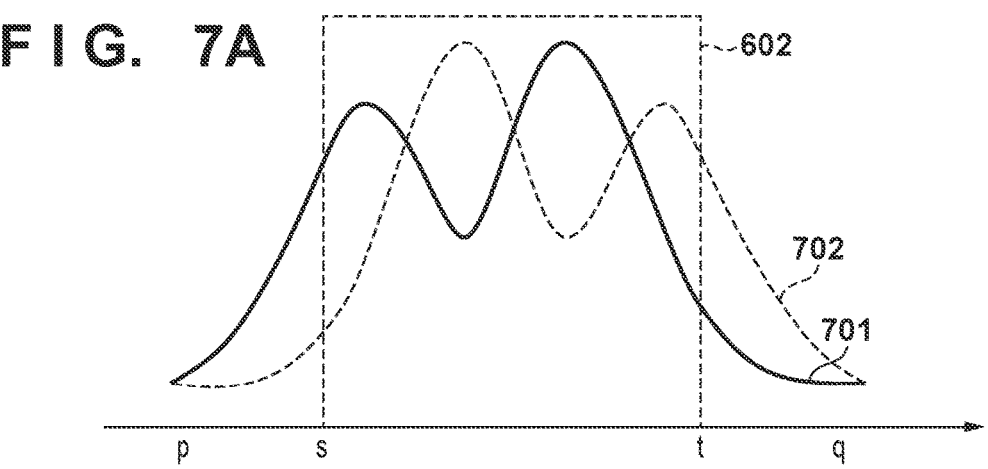
FIGS. 7A to 7C are diagrams showing an example of image signals obtained from the focus detection area shown in FIG. 6.
Figure 7B:
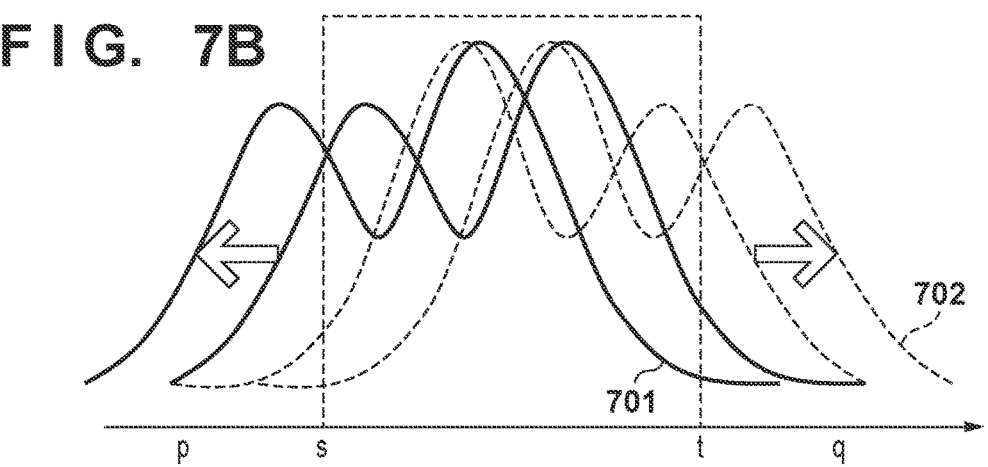
Figure 7C:
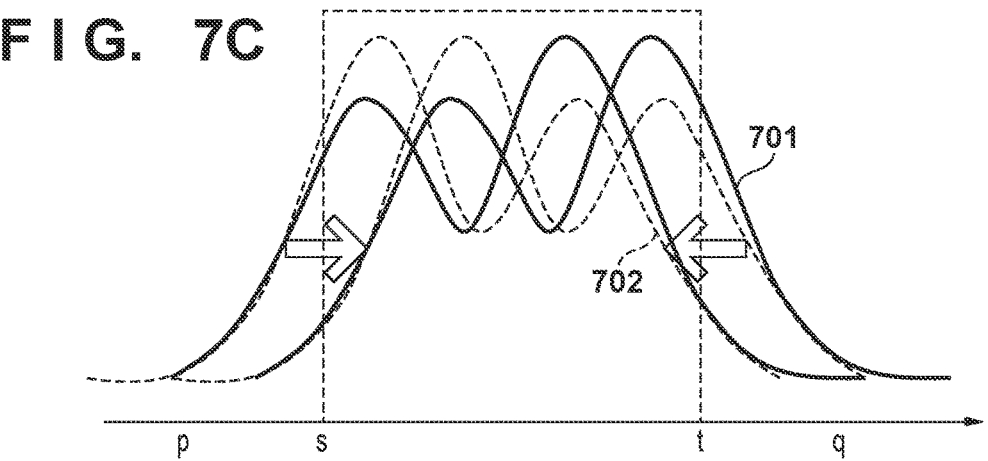

FIGS. 7A to 7C show exemplary AF image signals generated using the pixels included in the focus detection area 602 that was set in FIG. 6. Solid lines indicate an image A signal 701, and broken lines indicate an image B signal 702.

FIG. 7A shows an example of pre-shift image signals. FIGS. 7B and 7C show states where the pre-shift image signals in FIG. 7A are shifted in a positive direction and a negative direction. When the correlation amount is calculated, both the image A signal 701 and the image B signal 702 are shifted by one bit in the respective arrow directions.

A method for calculating a correlation amount COR will now be described. As shown in FIGS. 7B and 7C, the image A signal 701 and the image B signal 702 are shifted by one bit, and the sum of absolute values of differences between the image A signal and the image B signal at the respective times is calculated. Assuming that the shift amount is i, the smallest shift amount is p-s, the largest shift amount is p-t, the starting coordinate of the focus detection area 602 is x, and the end coordinate of the focus detection area 602 is y, the correlation amount COR can be calculated using Equation (1) below:

$$COR[i] = \sum_{k=x}^{y} |A[k+i] - B[k-i]| \quad (1)$$

$$\{(p-s) < i < (q-t)\}$$

Figure 8A:
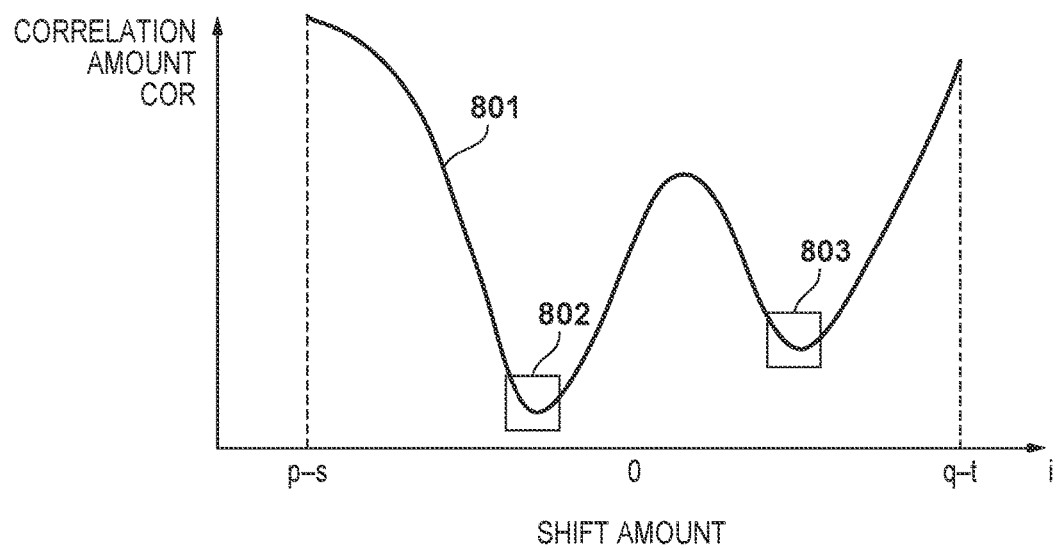
FIGS. 8A and 8B are diagrams showing an exemplary relationship between a shift amount and a correlation amount of the image signals shown in FIGS. 7A to 7C.

FIG. 8A is a diagram showing an exemplary relationship between the shift amount i and the correlation amount COR. The horizontal and vertical axes indicate the shift amount i and the correlation amount COR, respectively. Regarding zones 802 and 803 of minimum values on a correlation amount waveform 801, the degree of coincidence between the image A signal and the image B signal is higher in the zone 802, where the correlation amount is smaller than that in the zone 803.

Subsequently, a method for calculating the amount of correlation change $\Delta COR$ will be described. Initially, regarding the correlation amount indicated by the correlation amount waveform 801 in FIG. 8A, the amount of correlation change is calculated based on a difference between correlation amounts spanning two shift amounts. Assuming that the shift amount is i, the smallest shift amount is p-s, and the largest shift amount is p-t, the amount of correlation change $\Delta COR$ can be calculated using Equation (2) below.

$$\Delta COR[i] = COR[i-1] - COR[i+1]\{(p-s+1) < i < (q-t-1)\} \quad (2)$$

Figure 9A:
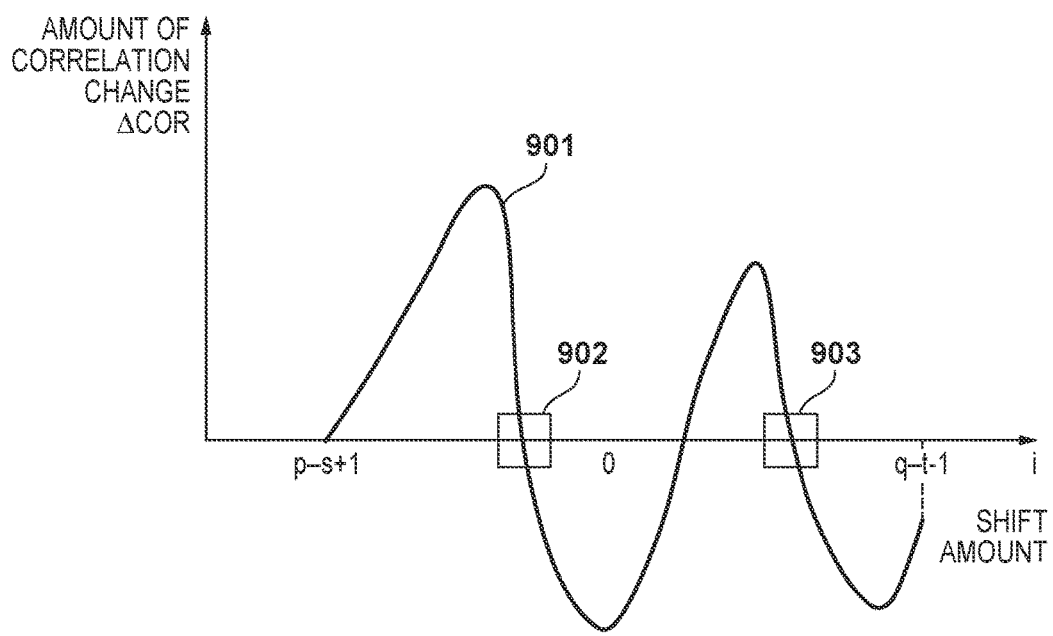
FIGS. 9A and 9B are diagrams showing an exemplary relationship between a shift amount and an amount of correlation change of the image signals shown in FIGS. 7A to 7C.

FIG. 9A is a diagram showing an exemplary relationship between the shift amount and the amount of correlation change $\Delta COR$. The horizontal and vertical axes indicate the shift amount i and the amount of correlation change $\Delta COR$, respectively. The sign of the amount of correlation change $\Delta COR$ switches from plus to minus in zones 902 and 903 on an amount-of-correlation change waveform 901. A state where the amount of correlation change $\Delta COR$ is 0 is called a zero-cross, where the degree of coincidence between the image A signal and the image B signal is highest. That is to say, the shift amount at the time of a zero-cross is the image shift amount (phase difference).

Figure 9B:
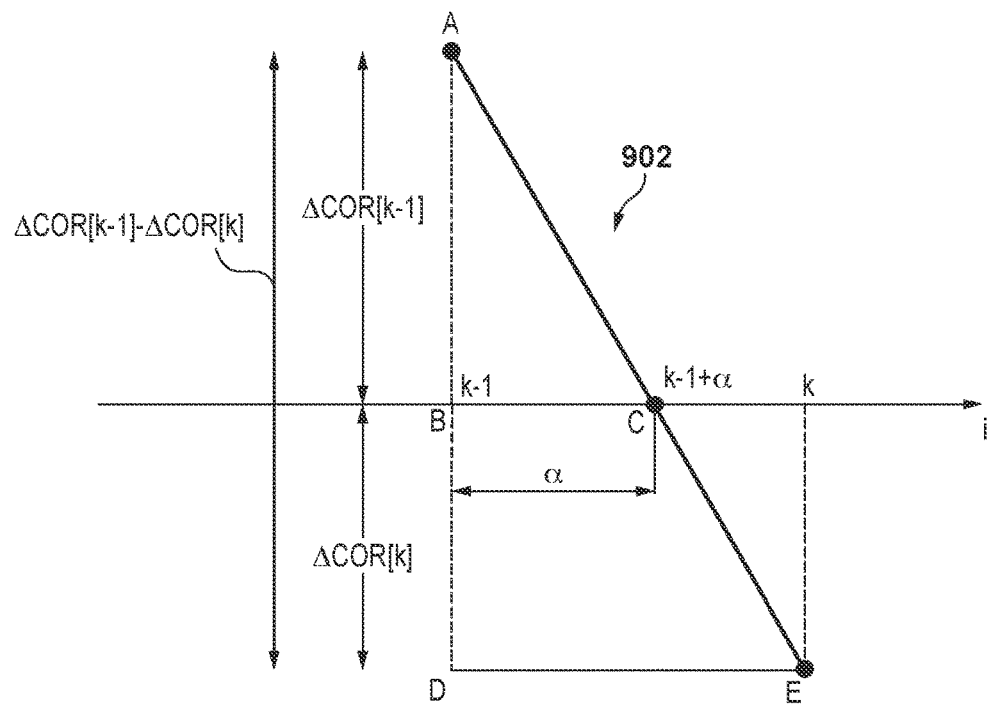

A method for calculating an image shift amount PRD will now be described using FIG. 9B, which enlarges the zone 902 in FIG. 9A.

Here, a shift amount (k−1+α) at the time of the zero-cross is divided into an integer portion β (=k−1) and a decimal fraction portion α. Because a triangle ABC and a triangle ADE in the diagram are in a similarity relation, the decimal fraction portion α can be calculated using Equation (3) below.

$$AB:AD = BC:DE \quad (3)$$

$$\Delta COR[k-1]:\Delta COR[k-1] - \Delta COR[k] = \alpha:k - (k-1)$$

$$\alpha = \frac{\Delta COR[k-1]}{\Delta COR[k-1] - \Delta COR[k]}$$

The integer portion β can be calculated using Equation (4) below, based on FIG. 9B.

$$\beta = k-1 \quad (4)$$

Then, the image shift amount PRD can be calculated based on the sum of α and β.

Note that, if the amount of correlation change $\Delta COR$ has a plurality of zero-crosses as shown in FIG. 9A, the zero-cross at which the amount of correlation change $\Delta COR$ is steepest is considered as a first zero-cross. Accurate detection can be more easily achieved with a zero-cross at which the amount of correlation change $\Delta COR$ is steeper. The steepness maxder can be calculated using Equation (5) below.

$$maxder = |\Delta COR[k-1]| + |\Delta COR[k]| \quad (5)$$

As described above, if there are a plurality of zero-crosses, the first zero-cross is determined based on the steepness, and the shift amount corresponding to the first zero-cross is considered as the image shift amount.

Subsequently, a method for calculating reliability of an image shift amount will be described. The reliability can be defined by, for example, the aforementioned steepness, or the degree of coincidence fnclvl between the image A signal and the image B signal (hereinafter called a two-image coincidence degree). The two-image coincidence degree is an index indicating the accuracy of an image shift amount, and in the calculation method according to this embodiment, a smaller value indicates a higher accuracy.

Figure 8B:
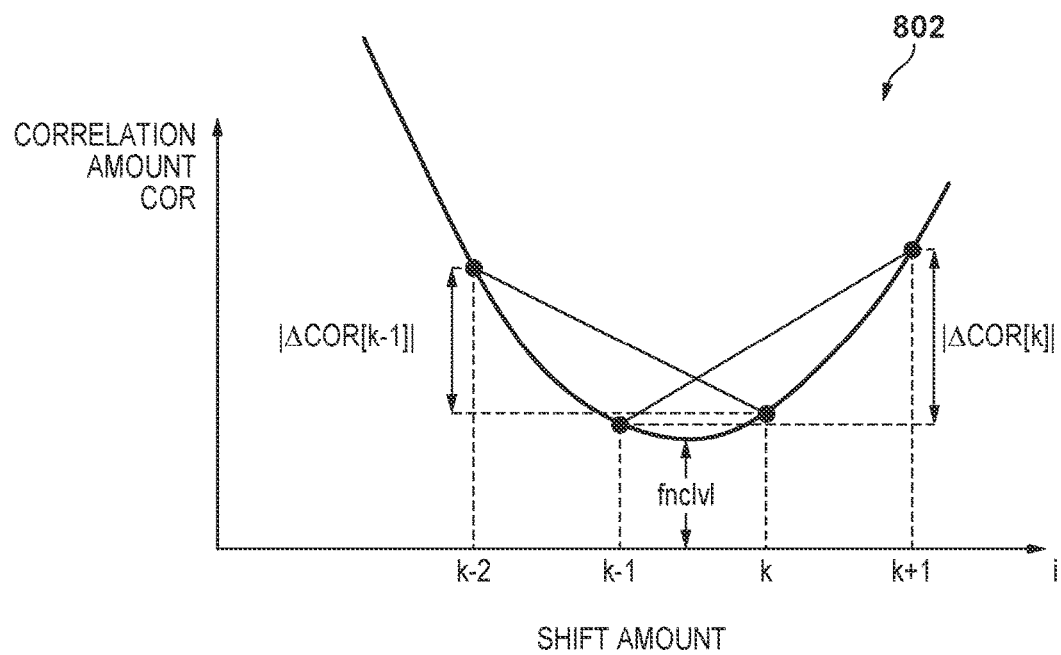

Using FIG. 8B, which enlarges the zone 802 in FIG. 8A, the two-image coincidence degree fnclvl can be calculated using Equation (6) below.

(i) When $|\Delta COR[k-1]| \times 2 \leq maxder$, $$fnclvl = COR[k-1] + \Delta COR[k-1]/4$$

(ii) When $|\Delta COR[k-1]| \times 2 > maxder$, $$fnclvl = COR[k] - \Delta COR[k]/4 \quad (6)$$

The AF signal processor 204 obtains the two-image coincidence degree fnclvl as the reliability (AF reliability) of an image shift amount (and of the defocus amount obtained by converting this image shift amount).

The AF operation according to this embodiment can be summarized as follows, mainly in terms of the threshold values.

If the AF reliability is greater than or equal to the first reliability threshold value, the defocus amount is smaller than or equal to the first defocus amount threshold value, the focus detection result is not affected by aperture control, and AE processing for AF has been completed, then it is determined that the digital camera is in an in-focus state (S417), and the AF operation ends.

If the AF reliability is greater than or equal to the second reliability threshold value and is greater than or equal to the first reliability threshold value, the focus detection result is not affected by aperture control, and the defocus amount is greater than the first defocus amount threshold value and smaller than or equal to the second defocus amount threshold value, then the focusing lens is driven correspondingly to the defocus amount (and direction) obtained through focus detection processing (S418).

If the AF reliability is greater than or equal to the second reliability threshold value, and the defocus amount is greater than the second defocus amount threshold value, then the focusing lens is not stopped, and continues to be moved in the focusing direction by an amount smaller than the amount corresponding to the defocus amount (S422).

If the AF reliability is smaller than the second reliability threshold value, and AE processing for AF has been completed, then the focusing lens continues to be moved in a set direction (irrespective of the defocus amount) (S428).

Meanwhile, the AF operation according to this embodiment can be summarized as follows, mainly in terms of AE processing for AF.

If AE processing for AF has not been completed, focus determination is not performed even if the AF reliability is greater than or equal to the first reliability threshold value, and the defocus amount is smaller than or equal to the first defocus amount threshold value, and the focusing lens is not moved even if a reliable result has been obtained regarding the defocus direction.

Further, if the focus detection result is affected by aperture control in AE processing for AF, focus determination is not performed even if the AF reliability is greater than or equal to the first reliability threshold value, and the defocus amount is smaller than or equal to the first defocus amount threshold value, and the focusing lens is not driven correspondingly to the defocus amount (and direction) obtained through focus detection processing even if the AF reliability is greater than or equal to the first reliability threshold value, and the defocus amount is greater than the first defocus amount threshold value and is smaller than or equal to the second defocus amount threshold value.

With this AF operation, the influence of the AE operation exerted on AF accuracy can be suppressed while the AE operation and the AF operation are concurrently carried out. In addition, even if the object's luminance changes during the AF operation, the AF operation can be performed under a more appropriate exposure condition due to the AE operation that is concurrently performed.

Other Embodiments

Although the AF operation according to the above embodiment (FIGS. 4A and 4B) employs a configuration in which AF processing starts after AE processing for AF has started, a configuration may alternatively be employed in which AE processing starts after AF processing has started.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-121222, filed on Jun. 17, 2016, which is hereby incorporated by reference herein in its entirety.

What is claimed is:

1. An image capture apparatus comprising:
   a memory device that stores a set of instructions; and
   at least one processor that executes the set of instructions to function as:

a focus detection unit configured to detect a defocus amount in an imaging optical system based on a signal obtained from an image sensor and to obtain a reliability of the detected defocus amount;

an exposure control unit configured to control exposure based on the signal obtained from the image sensor; and a control unit configured to control driving of a focusing lens based on the defocus amount, wherein:

the defocus amount detection and the exposure control are concurrently performed, in a case where the reliability of the defocus amount detected by the focus detection unit is greater than or equal to a first reliability threshold value, and the defocus amount is smaller than or equal to a first defocus amount threshold value:

if the defocus amount does not meet a first condition or a second condition, the control unit determines that the image capture apparatus in an in-focus state and ends the control of driving of the focusing lens;

if the defocus amount meets the first condition or the second condition, the control unit does not determine that the image capture apparatus is in an in-focus state; and the first condition is that it is determined that the defocus amount is based on a signal obtained before the exposure control is completed, and the second condition is that it is determined that the defocus amount is based on a signal affected by driving of an aperture in the exposure control, and the exposure control includes generating an evaluation value and determining an exposure condition based on the evaluation value, and also includes at least one of changing an exposure time and changing an f-number in accordance with the determined exposure condition.

2. The image capture apparatus according to claim 1, in a case where the reliability of the defocus amount detected by the focus detection unit is smaller than a second reliability threshold value, if the defocus amount does not meet the first condition, the control unit moves the focusing lens in a given direction irrespective of the defocus amount, and if the defocus amount meets the first condition, the control unit does not drive the focusing lens.

3. The image capture apparatus according to claim 1, in a case where the reliability of the defocus amount detected by the focus detection unit is smaller than the first reliability threshold value and greater than or equal to a second reliability threshold value, if the defocus amount does not meet the second condition, the control unit moves the focusing lens in a given direction by a smaller amount than an amount corresponding to the defocus amount, and if the defocus amount meets the second condition, the control unit does not drive the focusing lens.

4. The image capture apparatus according to claim 1, wherein the reliability of the defocus amount detected by the focus detection unit being greater than or equal to the first reliability threshold value indicates that a fluctuation of accuracy of the defocus amount falls within a given range.

5. The image capture apparatus according to claim 1, wherein the reliability of the defocus amount detected by the focus detection unit being smaller than a second reliability threshold value indicates that accuracy of the defocus amount is not guaranteed, whereas a defocus direction is guaranteed, and wherein the second reliability threshold value being larger than the first reliability threshold value.

6. The image capture apparatus according to claim 1, wherein the defocus amount detected by the focus detection unit being smaller than or equal to the first defocus amount threshold value indicates that the focusing lens has been driven into a range in which an object is brought into focus in the imaging optical system.

7. The image capture apparatus according to claim 1, wherein the defocus amount detected by the focus detection unit being smaller than or equal to the second defocus amount threshold value indicates that a number of times of driving required to cause the focusing lens to be at a focal depth is a given number of times or less.

8. The image capture apparatus according to claim 1, wherein the focus detection unit obtains the defocus amount based on an image shift amount between a pair of image signals, and the reliability one of a two-image coincidence degree, a two-image steepness degree, contrast information, saturation information, and damage information regarding the pair of images.

9. A method for controlling an image capture apparatus, comprising:

detecting a defocus amount in an imaging optical system based on a signal obtained from an image sensor;

obtaining a reliability of the detected defocus amount;

controlling exposure based on the signal obtained from the image sensor; and controlling driving of a focusing lens based on the defocus amount, wherein:

the detecting and the controlling exposure are concurrently performed, and in a case where the reliability of the defocus amount detected by the focus detection unit is greater than or equal to a first reliability threshold value, and the defocus amount is smaller than or equal to a first defocus amount threshold value:

if the defocus amount does not meet a first condition or a second condition, in the controlling driving, it is determined that the image capture apparatus is in an in-focus state and the control of driving of the focusing lens is ended;

if the defocus amount meets the first condition or the second condition, in the controlling driving, it is not determined that the image capture apparatus is in an in-focus state; and the first condition is that it is determined that the defocus amount is based on a signal obtained before the exposure control is completed, and the second condition is that it is determined that the defocus amount is based on a signal affected by driving of an aperture in the exposure control, wherein the controlling exposure includes generating an evaluation value and determining an exposure condition based on the evaluation value, and also includes at least one of changing an exposure time and changing an f-number in accordance with the determined exposure condition.

10. A non-transitory computer-readable medium storing a program for causing a computer provided in an image capture apparatus to function as an image capture apparatus comprising:

a focus detection unit configured to detect a defocus amount in an imaging optical system based on a signal obtained from an image sensor and to obtain a reliability of the detected defocus amount;

an exposure control unit configured to control exposure based on the signal obtained from the image sensor; and a control unit configured to control driving of a focusing lens based on the defocus amount, wherein:

the defocus amount detection and the exposure control are concurrently performed, in a case where the reliability of the defocus amount detected by the focus detection unit is greater than or equal to a first reliability threshold value, and the defocus amount is smaller than or equal to a first defocus amount threshold value:

if the defocus amount does not meet a first condition or a second condition, the control unit determines that the image capture apparatus is in an in-focus state and ends the control of driving of the focusing lens;

if the defocus amount meets the first condition or the second condition, the control unit does not determine that the image capture apparatus is in an in-focus state; and the first condition is that it is determined that the defocus amount is based on a signal obtained before the exposure control is completed, and the second condition is that it is determined that the defocus amount is based on a signal affected by driving of an aperture in the exposure control, and the exposure control includes generating an evaluation value and determining an exposure condition based on the evaluation value, and also includes at least one of changing an exposure time and changing an f-number in accordance with the determined exposure condition.

\* \* \* \* \*